US011095798B2

(12) United States Patent
Ishii et al.

(10) Patent No.: US 11,095,798 B2
(45) Date of Patent: Aug. 17, 2021

(54) IMAGE CAPTURING SYSTEM, IMAGE CAPTURING APPARATUS, AND CONTROL METHOD OF THE SAME

(71) Applicant: CANON KABUSHIKI KAISHA, Tokyo (JP)

(72) Inventors: Kazunori Ishii, Yokohama (JP); Makoto Yokozeki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/352,999

(22) Filed: Mar. 14, 2019

(65) Prior Publication Data

US 2019/0289174 A1    Sep. 19, 2019

(30) Foreign Application Priority Data

Mar. 15, 2018  (JP) .............................. JP2018-048397

(51) Int. Cl.
*H04N 5/225* (2006.01)
*H04N 5/243* (2006.01)
*H04N 5/238* (2006.01)
*H04N 5/235* (2006.01)
*G06T 7/60* (2017.01)
*G06T 7/80* (2017.01)
*B25J 9/16* (2006.01)

(52) U.S. Cl.
CPC .......... *H04N 5/2253* (2013.01); *B25J 9/1697* (2013.01); *G06T 7/60* (2013.01); *G06T 7/80* (2017.01); *H04N 5/238* (2013.01); *H04N 5/2353* (2013.01); *H04N 5/243* (2013.01); *G05B 2219/50391* (2013.01)

(58) Field of Classification Search
CPC ...... H04N 5/2253; H04N 5/243; H04N 5/238; H04N 5/2353; G06T 7/60; G06T 7/80; B25J 9/1697; G05B 2219/50391
See application file for complete search history.

(56) References Cited

U.S. PATENT DOCUMENTS

| | | | | | |
|---|---|---|---|---|---|
| 4,785,323 | A | * | 11/1988 | Bell | G02B 7/28 396/213 |
| 5,204,710 | A | * | 4/1993 | Tsukamoto | G02B 7/102 348/347 |
| 2007/0083098 | A1 | * | 4/2007 | Stern | A61B 1/00193 600/407 |
| 2013/0314500 | A1 | * | 11/2013 | Aoki | H04N 13/296 348/46 |

(Continued)

FOREIGN PATENT DOCUMENTS

JP    2003-211382 A    7/2003

*Primary Examiner* — Zaihan Jiang
(74) *Attorney, Agent, or Firm* — Cowan, Liebowitz & Latman, P.C.

(57) ABSTRACT

An image capturing apparatus that is attachable to a robot arm, comprises an image capturing device configured to capture an object image, a receiving unit configured to receive information relating to status of the robot arm from a control apparatus for controlling the robot arm, and an imaging control unit configured to control an image capturing operation of the image capturing device that is performed on an object, wherein the imaging control unit controls the image capturing operation based on the information relating to status of the robot arm that was notified by the control apparatus.

8 Claims, 10 Drawing Sheets

(56) References Cited

U.S. PATENT DOCUMENTS

| | | | |
|---|---|---|---|
| 2015/0002671 A1* | 1/2015 | Hayakawa | G06K 9/00805 |
| | | | 348/148 |
| 2015/0334289 A1* | 11/2015 | Yoshino | H04N 5/23212 |
| | | | 348/353 |
| 2016/0094780 A1* | 3/2016 | Monkiewicz | H04N 5/2251 |
| | | | 348/164 |
| 2016/0291571 A1* | 10/2016 | Cristiano | B25J 9/1697 |
| 2017/0007342 A1* | 1/2017 | Kasai | A61B 90/361 |
| 2018/0243913 A1* | 8/2018 | Yamashita | B25J 13/08 |
| 2018/0368656 A1* | 12/2018 | Austin | A61B 90/20 |
| 2019/0073760 A1* | 3/2019 | Wang | G06T 7/0004 |
| 2019/0287237 A1* | 9/2019 | de Bonfim Gripp | G06T 7/136 |
| 2019/0327394 A1* | 10/2019 | Ramirez Luna | H04N 5/2252 |

\* cited by examiner

L: OBJECT DISTANCE (mm)

H: DISTANCE FROM FRONT LENS TO HAND LEADING END (mm)

X: DISTANCE BETWEEN LENS OPTICAL AXIS AND HAND CENTRAL AXIS (mm)

FIG. 6A

CALIBRATION INFORMATION

| ITEM | STORED DATA |
|---|---|
| FRONT LENS TO ARM LEADING END DISTANCE (H) | 50(mm) |
| LENS OPTICAL AXIS TO HAND CENTRAL AXIS DISTANCE (X) | 40(mm) |
| OBJECT DISTANCE (L) | 350(mm) |
| RECTANGULAR SIZE OF OBJECT (SIZE OF W ON IMAGE) | 69(pix) |

FIG. 6B

CALIBRATION INFORMATION

| ITEM | STORED DATA |
|---|---|
| FRONT LENS TO ARM LEADING END DISTANCE (H) | 50(mm) |
| LENS OPTICAL AXIS TO HAND CENTRAL AXIS DISTANCE (X) | 40(mm) |
| RECTANGULAR SIZE OF OBJECT (ACTUAL SIZE W) | 10(mm) |

IMAGE CAPTURING SYSTEM, IMAGE CAPTURING APPARATUS, AND CONTROL METHOD OF THE SAME

BACKGROUND OF THE INVENTION

Field of the Invention

The present invention relates to a technique for controlling an image capturing apparatus based on the positional relationship between a robot arm and an object.

Description of the Related Art

For example, in assembly robots and the like, it is common that the robots are controlled using cameras when robot arms thereof pick and place workpieces. The control is such that each camera attached to the leading end of a hand portion of a robot arm captures an image of a workpiece, the position of the workpiece is detected based on the captured image data, and the robot arm is moved to the detected position to hold the workpiece using a hand.

Japanese Patent Laid-Open No. 2003-211382 discloses, as this type of robot control apparatus, an apparatus provided with a camera that includes an optical system adjusting unit that has a focus adjustment function, a focal length adjustment function, an aperture adjustment function, and the like, the optical system adjusting unit being controlled based on captured image data obtained by capturing an image of a workpiece.

However, the above-described conventional technology is configured such that visual feedback control, which is referred to as visual servoing, is used to store the feature amount of an object as target data, and to adjust focus, focal length, and aperture so that an error from the feature amount stored as target data is reduced.

In this control, an image of the object is captured, the captured image is transmitted to a visual recognition apparatus, which compares current data with the target data to calculate an error thereof, and the robot and the camera are again controlled repeatedly so that the error is reduced (to 0). Accordingly, time is required to reduce the error. This prevents smooth movement of the operation of the robot arm.

Also, when bringing objects into focus, if the distance to an object varies, time is required to capture images of the objects and adjust the focal positions while checking whether or not the objects are in focus based on the captured images, because the same control needs to be performed for each distance.

Accordingly, it is conceivable to provide an autofocus function, which automatically brings an object into focus, but time is required to achieve focus if searching for a position at which focus is achieved is started from a position away from an in-focus position.

Furthermore, when adjusting the focal length so that the entire image of an object appears within the field of view of the camera, time is required to adjust the focal length while checking whether or not part or all of the object image is out of the field of view of the camera.

Furthermore, when setting appropriate exposure conditions for an object, a case is conceivable in which the environment of surrounding light is different according to the distance to the object. Time is required to adjust exposure while checking whether or not the exposure conditions are appropriate based on the captured image.

Accordingly, it is conceivable to provide an AE function, which detects the surrounding light of the object and automatically adjusts the aperture amount, the shutter speed, and the gain, but there is the problem that time is required until exposure conditions appropriate for the objects are achieved.

SUMMARY OF THE INVENTION

The present invention was made in view of the aforementioned problems, and provides a system for controlling a camera attached to a robot, in which it is possible to reduce the time required to control the camera even if the distance to an object varies.

According to a first aspect of the present invention, there is provided an image capturing apparatus that is attachable to a robot arm comprising: an image capturing device configured to capture an object image; at least one processor or circuit configured to function as the following units: a receiving unit configured to receive information relating to status of the robot arm from a control apparatus for controlling the robot arm; and an imaging control unit configured to control an image capturing operation of the image capturing device that is performed on an object, wherein the imaging control unit controls the image capturing operation based on the information relating to status of the robot arm that was notified by the control apparatus.

According to a second aspect of the present invention, there is provided a method for controlling an image capturing apparatus that is attachable to a robot arm, the method comprising: receiving information relating to status of the robot arm from a control apparatus for controlling the robot arm; and controlling an image capturing operation in which the image capturing apparatus captures an object image, wherein, in the controlling, the image capturing operation is controlled based on the information relating to status of the robot arm that was notified from the control apparatus.

According to a third aspect of the present invention, there is provided an image capturing system comprising: an image capturing apparatus attached to a robot arm; the robot arm; and a control apparatus configured to control the image capturing apparatus, wherein the control apparatus includes: at least one processor or circuit configured to function as a notification unit configured to notify the image capturing apparatus of information relating to status of the robot arm, and the image capturing apparatus includes: an image capturing device configured to capture an object image; and at least one processor or circuit configured to function as the following units: an imaging control unit configured to control an image capturing operation of the image capturing device that is performed on an object; and a receiving unit configured to receive the information relating to status of the robot arm, the imaging control unit controlling the image capturing operation based on the information relating to status of the robot arm received from the control apparatus by the receiving unit.

Further features of the present invention will become apparent from the following description of exemplary embodiments with reference to the attached drawings.

BRIEF DESCRIPTION OF THE DRAWINGS

FIGS. 6A and 6B are diagrams showing examples of calibration information according to the third embodiment.

DESCRIPTION OF THE EMBODIMENTS

First Embodiment

Configuration of Image Capturing System

An image capturing system according to a first embodiment of the present invention will be described. In the image capturing system, an image capturing apparatus that is installed on a robot arm is controlled based on the positions of the robot arm and an object.

Figure 1A:
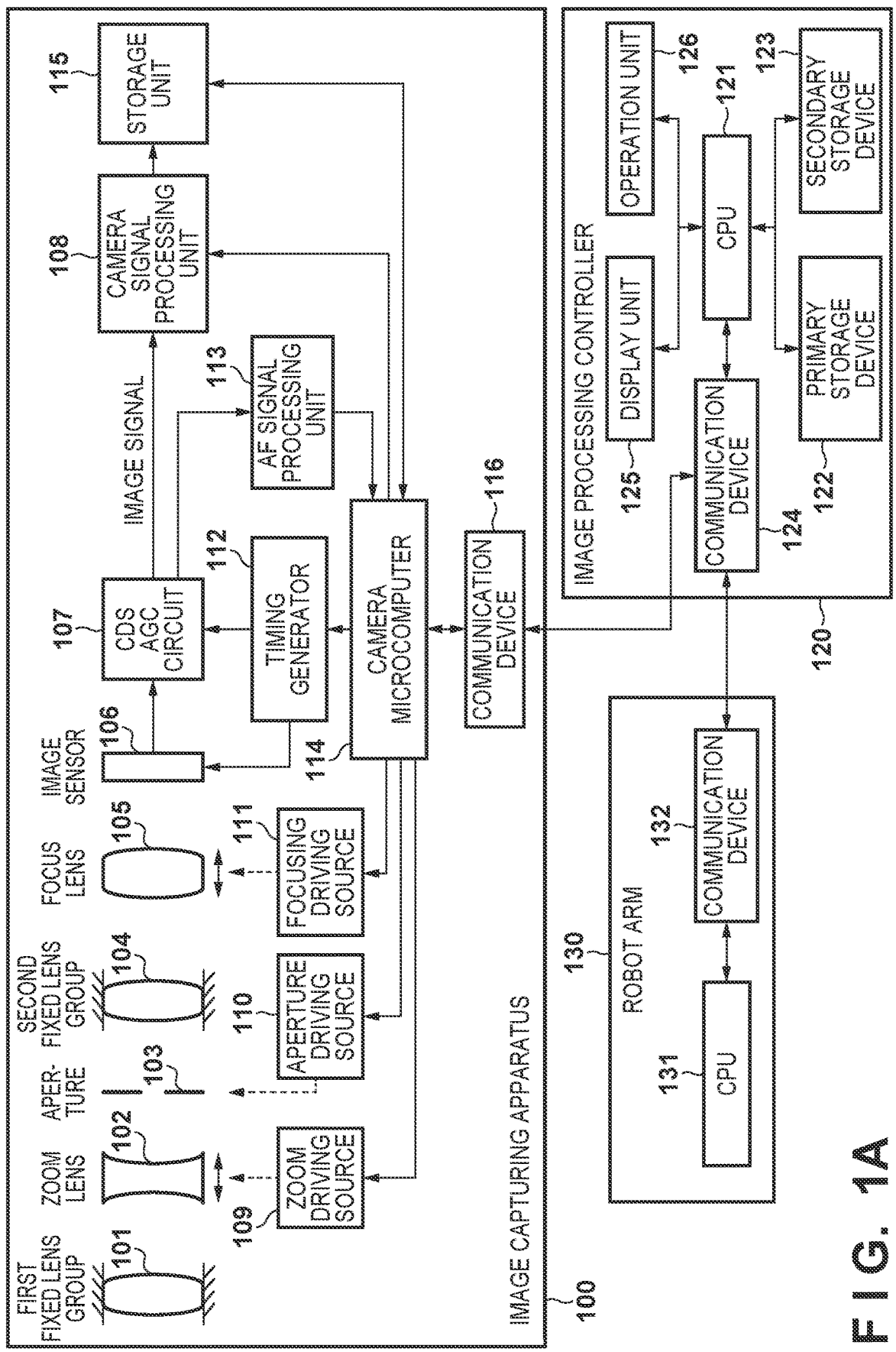
FIG. 1A is a block diagram showing a configuration of an image capturing system according to a first embodiment of the present invention.

FIG. 1A is a block diagram showing a configuration of the image capturing system according to the first embodiment of the present invention. This image capturing system has a configuration in which an image capturing apparatus 100, an image processing controller 120, and a robot arm 130 are communicably connected to each other.

The image capturing apparatus 100 includes, as an imaging optical system, a first fixed lens group 101, a zoom lens 102, a diaphragm 103, a second fixed lens group 104, and a focus lens (focus compensator lens) 105. The zoom lens 102 can be moved in a direction along an optical axis to change the magnification (zoom adjustment) and change the focal length. The focus lens 105 has both a focusing function and a function of correcting movement of the focal plane that occurs when magnification is changed.

A zoom driving source 109 is a driving source for moving the zoom lens 102. A diaphragm driving source 110 is a driving source for moving the diaphragm 103. A focusing driving source 111 is a driving source for moving the focus lens 105. The zoom driving source 109, the diaphragm driving source 110, and the focusing driving source 111 are each constituted by an actuator such as a stepping motor, a DC motor, a vibrating motor, or a voice coil motor.

The image capturing apparatus 100 further includes an image sensor 106, a CDS/AGC circuit 107, a camera signal processing unit 108, a timing generator 112, an AF signal processing unit 113, a storage unit 115, a camera microcomputer 114, and a communication device 116.

The image sensor 106 is an element for photoelectrically converting an image of an object, and is constituted by a CCD or CMOS sensor, for example. The image sensor 106 includes a plurality of pixels arranged in matrix. A luminous flux that has passed through the imaging optical system forms an image on a light receiving surface of the image sensor 106, and is converted into signal charges that correspond to the amounts of incident light by photodiodes (photoelectric conversion units) provided in the pixels. The signal charges accumulated in the photodiodes are sequentially read from the image sensor 106 as voltage signals that correspond to the signal charges, based on driving pulses given by the timing generator 112 in accordance with an instruction by the camera microcomputer 114.

The output signals read from the image sensor 106 are sampled and are input to the CDS/AGC circuit 107, which adjusts the gain thereof. The camera signal processing unit 108 subjects the image signals output from the CDS/AGC circuit 107 to various types of image processing, and generates image signals. In the first embodiment, the image signals are still image or moving image signals that are to be used in robot control. The storage unit 115 stores the image signals from the camera signal processing unit 108.

The AF signal processing unit 113 extracts, from signals that have passed through an AF gate, a high-frequency component, a luminance difference component (a difference between a maximum value and a minimum value in brightness level of the signals that have passed through the AF gate), and the like, and generates AF evaluation value signals, the AF gate being configured to only let through signals in the area to be used in focus detection, out of the output signals from all of the pixels of the CDS/AGC circuit 107. The AF evaluation value signals are output to the camera microcomputer 114. An AF evaluation value signal indicates a sharpness level (contrast status) of a video signal that is generated based on the output signal from the image sensor 106, but the sharpness level varies according to the focus status of the imaging optical system, and as a result, the AF evaluation value signal is a signal indicating the focus status of the imaging optical system.

The camera microcomputer 114 controls the overall operation of the image capturing apparatus 100, and performs AF control (automatic focus adjustment control) by controlling the focusing driving source 111 to move the focus lens 105. As the AF control, the camera microcomputer 114 performs AF control using a TV-AF method (hereinafter, referred to simply as "TV-AF"). The TV-AF method is a focus detection method in which focus detection is performed using contrast detection as described above. Furthermore, the camera microcomputer 114 performs focal length control by controlling the zoom driving source 109 to move the zoom lens 102, and performs aperture control by controlling the diaphragm driving source 110 to operate the diaphragm 103.

The communication device 116 is a device for communicating with the image processing controller 120. The image processing controller 120 instructs the image capturing apparatus 100 to capture an image, analyzes the captured image, and gives instructions relating to various types of camera control (focus control, exposure control, and focal length control). Furthermore, the image processing controller 120 transmits, to the image capturing apparatus 100, a distance to the object according to the operation status of the robot arm 130 and the position status of the robot arm 130, namely, the image processing controller 120 notifies the image capturing apparatus 100 of the distance to the object, and receives the image capture status of the camera, for example. Furthermore, the image processing controller 120 gives operation instructions to the robot arm 130. Note that the operation status of the robot arm 130 and the position status of the robot arm 130 are determined based on values detected by various sensors provided on the robot arm 130, an instruction command transmitted from the image processing controller 120 to the robot arm 130, and the like. Furthermore, data is transmitted and received in conformity with a predetermined communication protocol. Here, data is transmitted and received using commands determined in advance for the respective types of instructions.

The image processing controller 120 includes a CPU 121, a primary storage device 122, a secondary storage device 123, a communication device 124, a display unit 125, and an operation unit 126. The CPU 121 performs overall control of the image processing controller 120. The secondary storage device 123 is constituted by a hard disk and the like, and stores a program for operating the CPU 121. The primary storage device 122 is constituted by a RAM and the like, and stores a program read from the secondary storage device 123. The communication device 124 communicates with the image capturing apparatus 100 and the robot arm 130. The display unit 125 displays a captured image, text for dialogue-based operations, and the like. The operation unit 126 accepts a user operation.

The image capturing apparatus 100 is fixed to the robot arm 130. When the robot arm 130 is moved, the image capture range of the image capturing apparatus 100 changes. Furthermore, the robot arm 130 can use a robot hand provided at the leading end of the arm to hold an object of which an image is to be captured. The CPU 131 controls the entire robot arm 130. The communication device 132 communicates with the image processing controller 120.

Figure 1B:
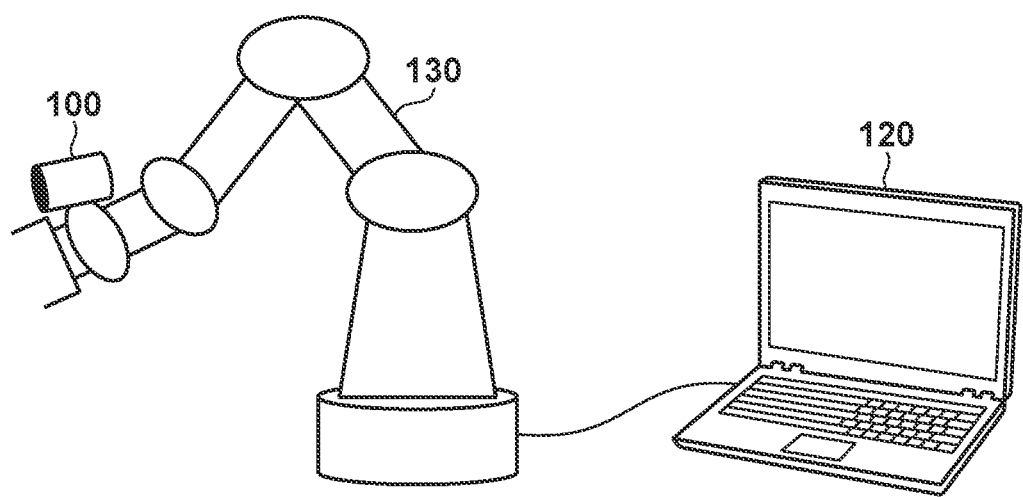
FIG. 1B is a diagram schematically showing the outer appearances of an image capturing apparatus, an image processing controller, and a robot arm.

Also, FIG. 1B is a diagram schematically showing the outer appearances of the image capturing apparatus 100, the image processing controller 120, and the robot arm 130. Note that, in the present embodiment, it is assumed that the image processing controller 120 serves as the master, and gives instructions to the image capturing apparatus 100 and the robot arm 130.

Focus Control Processing

The following will describe focus control processing that is executed by the camera microcomputer 114. Here, using the TV-AF method, the focus lens 105 is moved, AF evaluation value signals are acquired for respective positions of the focus lens 105, and the focus lens position with the largest AF evaluation value signal is searched for. Then, lastly, a one-shot AF operation is executed in which the focus lens 105 is moved to and stopped at the focus lens position with the largest AF evaluation value signal.

Figure 2:
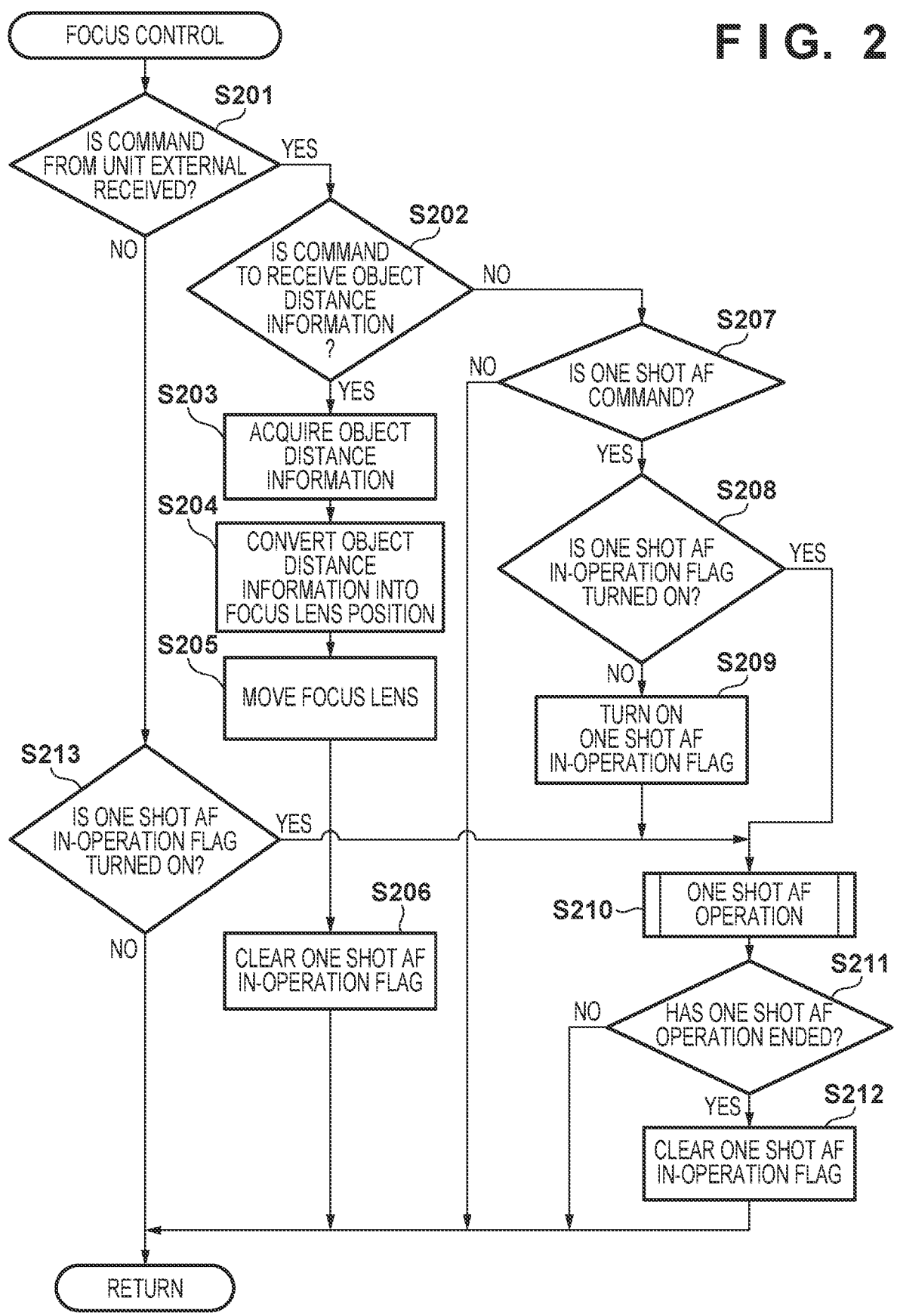
FIG. 2 is a flowchart showing focus control performed by the image capturing apparatus of the first embodiment.

FIG. 2 is a flowchart showing focus control processing that is executed by the camera microcomputer 114 shown in FIG. 1A. The present processing is executed in accordance with a computer program stored in the camera microcomputer 114. Furthermore, the present processing is executed, for example, with a period (vertical synchronization period) at which image signals are read out from the image sensor 106 to generate a one-field image (hereinafter, referred to also as one frame or one picture plane). Note, however, that the present processing may also be repeated a plurality of times within the vertical synchronization period (V rate).

First, in step S201, the camera microcomputer 114 determines whether or not a command has been received from the image processing controller 120 via the communication device 116. If a command has been received (Yes in step S201), the procedure moves to step S202, and if no command has been received (No in step S201), the procedure moves to step S213.

In step S202, the camera microcomputer 114 determines whether or not the received command is a command to receive, from the image processing controller 120, information indicating the distance to an object (object distance information) based on the position status of the robot arm. If the received command is a command to receive object distance information (Yes in step S202), object distance information that is transmitted from the image processing controller 120 is acquired (step S203), and the acquired object distance information is converted into information relating to the position of the focus lens (focus lens position information) (step S204). The conversion of object distance information into focus lens position information may be performed based on information stored in advance in a nonvolatile memory or the like that is related to object distances corresponding to focus lens positions according to the zoom position, but is not limited to this.

In step S205, the camera microcomputer 114 moves the focus lens 105 to the focus lens position calculated in step S204, and in step S206, a one-shot AF in-operation flag is cleared.

If it is determined in step S202 that the received command is not a command to receive object distance information (No in step S202), it is determined in step S207 whether or not the received command is a one-shot AF command. If it is not a one-shot AF command (No in step S207), the procedure is ended, and if it is a one-shot AF command (Yes in step S207), it is determined in step S208 whether or not a one-shot AF in-operation flag is ON.

If the one-shot AF in-operation flag is ON (Yes in step S208), one-shot AF operation processing is continued in step S210. If no one-shot AF in-operation flag is ON (No in step S208), the one-shot AF in-operation flag is turned on in step S209, and a one-shot AF operation is started in step S210.

Then, in step S211, it is determined whether or not the one-shot AF operation is completed. If the one-shot AF operation is not completed (No in step S211), the processing is ended, and if the one-shot AF operation is completed (Yes in step S211), the one-shot AF in-operation flag is cleared in step S212.

In step S213, if the one-shot AF in-operation flag is ON (Yes in step S213), the one-shot AF operation is continued in step S210. If no one-shot AF in-operation flag is ON (No in step S213), the processing is ended.

Note that the present embodiment is described on the assumption of a sequence in which, after a command to receive object distance information and a one-shot AF command have been received, no subsequent command is accepted until the control in accordance with the commands is completed, but the present invention is not limited to this. For example, if it is assumed that commands to receive object distance information can be received with a predetermined period on a regular basis, a configuration may be employed in which no command to receive object distance information is allowed to be received while one-shot AF command control is being executed.

With the above-described operation, the image capturing apparatus 100 receives, from the image processing controller 120, the distance to an object or the distance to an object to which it is to move. By moving the focus lens based on the distance, it is possible to move the focus lens to the vicinity of an in-focus position while the robot arm 130 operates, making it possible to reduce the time required to achieve focus after operation of the robot arm 130. Furthermore, it is also possible to reduce the time required to achieve focus in the one-shot AF operation.

Furthermore, it is also conceivable to prohibit movement of the focus lens, if the amount of change in the object distance information received in accordance with the command to receive object distance information is equal to or smaller than a predetermined value. If the change in the object distance information is within a depth of field or a depth of focus, focus can be achieved without moving the focus lens. This does not affect image recognition of the object, but enables a reduction in the length of a time period in which the focus lens is moved. In this case, the predetermined value may be defined based on the depth of field or the depth of focus. Furthermore, if the change in the object distance information is small, the movement amount of the robot arm 130 is also small. At this time, the time period cannot be reduced unless the focus lens is moved while the robot arm 130 is moving. In this case, the predetermined value only needs to be defined based on the moving speed of the robot arm 130 and the moving speed of the focus lens. Furthermore, since the movement amounts of the focus lens with respect to the amounts of change in the object distance differ according to the object distance, different predetermined values may also be set for the object distances.

Second Embodiment

Figure 3:
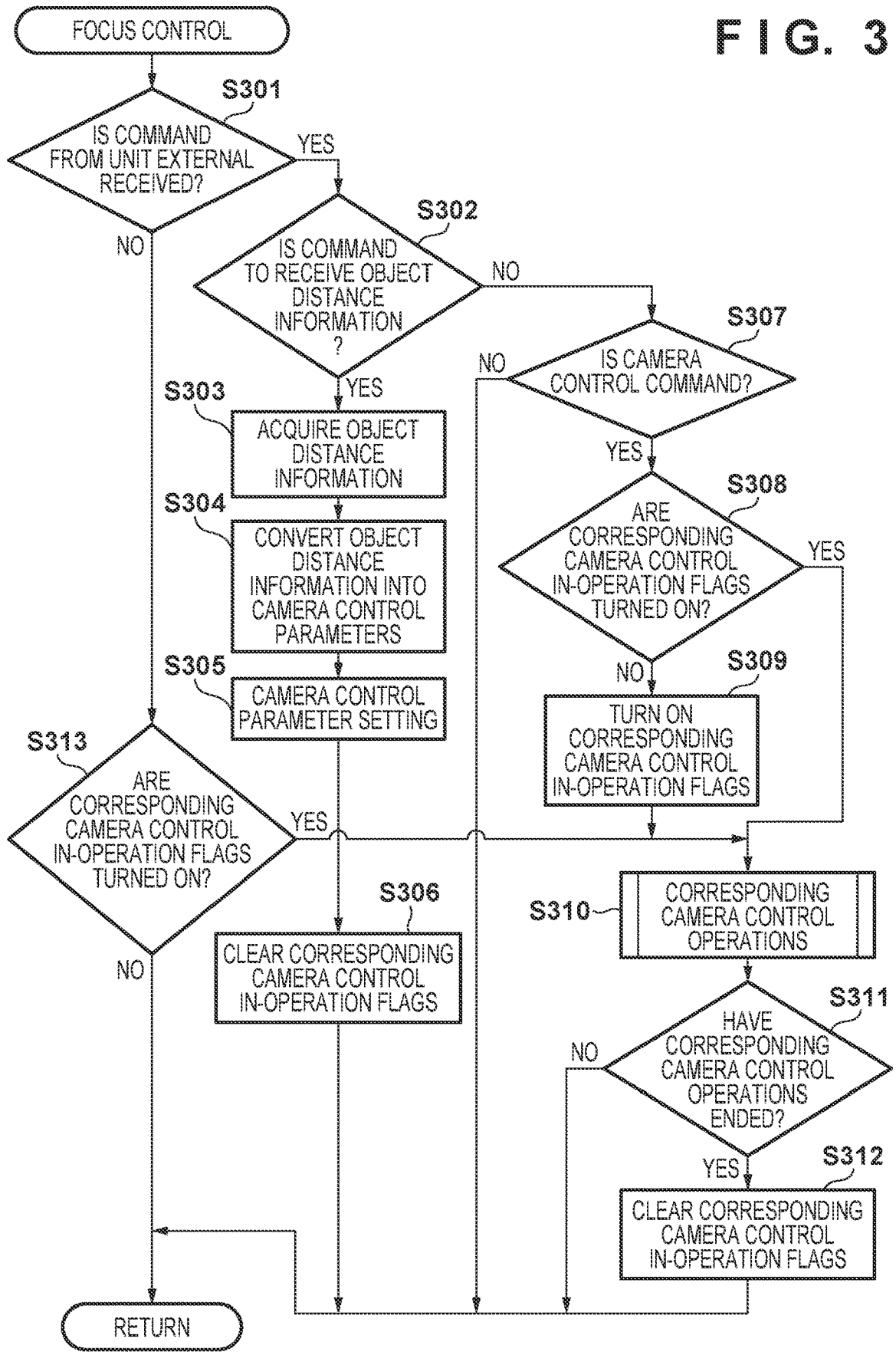
FIG. 3 is a flowchart showing camera control performed by an image capturing apparatus according to a second embodiment.

FIG. 3 is a flowchart showing various types of camera control processing (imaging control) such as focal length control, aperture control, and exposure control (image capturing operation) that are executed by the camera microcomputer 114 shown in FIG. 1A. The present processing is executed in accordance with a computer program stored in the camera microcomputer 114.

First, in step S301, the camera microcomputer 114 determines whether or not a command from the image processing controller 120 has been received via the communication device 116. If a command has been received (Yes in step S301), the procedure moves to step S302, and if no command has been received (No in step S301), the procedure moves to step S313.

In step S302, the camera microcomputer 114 determines whether or not the received command is a command to receive, from the image processing controller 120, object distance information based on the position status of the robot arm. If the received command is a command to receive object distance information (Yes in step S302), object distance information that is transmitted from the image processing controller 120 is acquired (step S303), and the acquired object distance information is converted into a parameter relating to the corresponding camera control (step S304).

Here, the various types of camera control include focal length control, aperture control, shutter speed control (shutter speed changing control), and gain control (gain changing control). A focal length position, an aperture position, a shutter speed value, and a gain value that are predetermined with respect to object distance information are stored in a not-shown nonvolatile memory or the like. Also, the camera microcomputer 114 acquires the focal length position, the aperture position, the shutter speed value, and the gain value that correspond to the object distance information from the nonvolatile memory.

For example, in focal length control, an object appears to be larger the shorter the distance to the object is. Accordingly, the image capture range is set to be larger the shorter the distance to the object is, so that the object is not out of the image capture range. In other words, for focal length control, parameters that indicate shorter focal length the shorter the distance to the object is are stored.

Furthermore, in aperture control, the depth of field is smaller the shorter the distance to the object is. Accordingly, the focal position needs to be accurate. Thus, for aperture control, parameters that indicate smaller aperture the shorter the distance to the object is are stored. Accordingly, it is possible to reduce strictness in accuracy in focusing.

In shutter speed control and gain control, a case is conceivable in which the object is hidden by the robot arm and appears darker the shorter the distance to the object is. Accordingly, in order to achieve appropriate exposure conditions, shooting needs to be performed in a brighter environment the shorter the distance to the object is. Accordingly, for shutter speed control and gain control, parameters that indicate a slower shutter speed the shorter the distance to the object is, and parameters that indicate a higher gain the shorter the distance to the object is are stored. Accordingly, it is possible to reduce the time it takes until appropriate exposure conditions are achieved.

In step S305, the camera control parameters calculated in step S304 are set, and focal length control, aperture control, shutter speed control, and gain control are performed based on the set parameters. Then, in step S306, the corresponding camera control in-operation flag is cleared.

On the other hand, if, in step S302, the received command is not a command to receive object distance information (No in step S302), it is determined in step S307 whether or not the received command is a camera control command such as a focal length control command, an aperture control command, a shutter speed control command, or a gain control command. If the received command is not such a camera control command (No in step S307), the procedure is ended, and if the received command is such a camera control command (Yes in step S307), it is determined in step S308 whether or not the corresponding camera control in-operation flag is ON.

In step S308, if the corresponding camera control in-operation flag is ON (Yes in step S308), the corresponding camera control processing is continued in step S310. If no corresponding camera control in-operation flag is ON (No in step S308), the corresponding camera control in-operation flag is turned on in step S309, and in step S310, the corresponding camera control operation is started.

Then, it is determined in step S311 whether or not the corresponding camera control operation is completed, and if the corresponding camera control operation is not completed (No in step S311), the procedure is ended. If the corresponding camera control operation is completed (Yes in step S311), the corresponding camera control in-operation flag is cleared in step S312.

In step S313, if the corresponding camera control in-operation flag is ON (Yes in step S313), the corresponding camera control operation is continued in step S310, and if no corresponding camera control in-operation flag is ON (No in step S313), the procedure is ended.

Note that the present embodiment is described on the assumption of a sequence in which, after a command to receive object distance information and a camera control command have been received, no subsequent command is accepted until the control in accordance with the commands is completed, but the present invention is not limited to this. For example, if it is assumed that commands to receive object distance information are received with a predetermined period on a regular basis, a configuration may be employed in which no command to receive object distance information is allowed to be received while camera control in accordance with any of the camera control commands is being executed.

With the above-described operation, the image capturing apparatus 100 receives, from the image processing controller 120, the distance to an object or the distance to an object to which it is to move. By performing focal length control, aperture control, shutter speed control, and gain control based on the distance, it is possible to control, while the robot arm 130 operates, the camera to have the image capture range, focus accuracy, and exposure conditions that are appropriate for recognition of an object image. Accordingly, it is also possible to reduce the time required to recognize the object image after the operation of the robot arm 130. Accordingly, the operation of the robot arm 130 can also be smoothly controlled.

Third Embodiment

Calibration Processing

Figure 4:
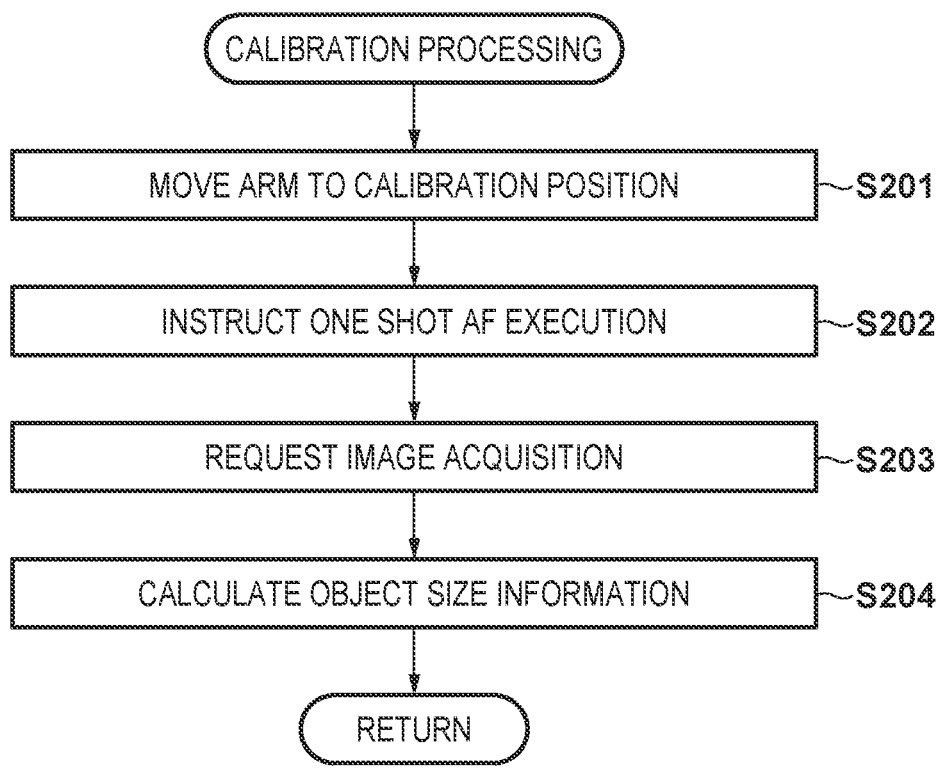
FIG. 4 is a flowchart showing calibration processing according to a third embodiment.

FIG. 4 is a flowchart showing operations of the image processing controller 120 and the robot arm 130 for generating reference data (calibration information shown in FIGS. 6A and 6B).

Note, however, that it is assumed in the present embodiment that "distance information relating to the position of a front lens of the image capturing apparatus 100 and the position of the leading end of the hand of the robot arm 130", and "distance (X) 313 between the lens optical axis and the hand central axis" are stored in advance in the secondary storage device 123 of the image processing controller 120. On the other hand, information relating to the distance to an object when the robot arm 130 has moved to a calibration position may be notified from the robot arm 130 or may be stored in advance in the secondary storage device 123 of the image processing controller 120.

First, when a user inputs a calibration operation instruction to the image processing controller 120 using the operation unit 126, the CPU 121 instructs, in step S201, the robot arm 130 to move to the calibration position using the communication device 124.

Then, in step S202, the CPU 121 notifies the image capturing apparatus 100 of a one-shot AF execution instruction via the communication device 124. In step S203, the CPU 121 notifies, via the communication device 124, the image capturing apparatus 100 of a request to capture an image and transmit the captured image.

In step S204, upon receiving the image from the image capturing apparatus 100, the CPU 121 calculates the size of the object, stores the calculated size in the secondary storage device 123, and ends the calibration processing. The method for calculating the object size and the type of the object size will be described later with reference to FIGS. 6A and 6B.

Calibration Information

Figure 5:
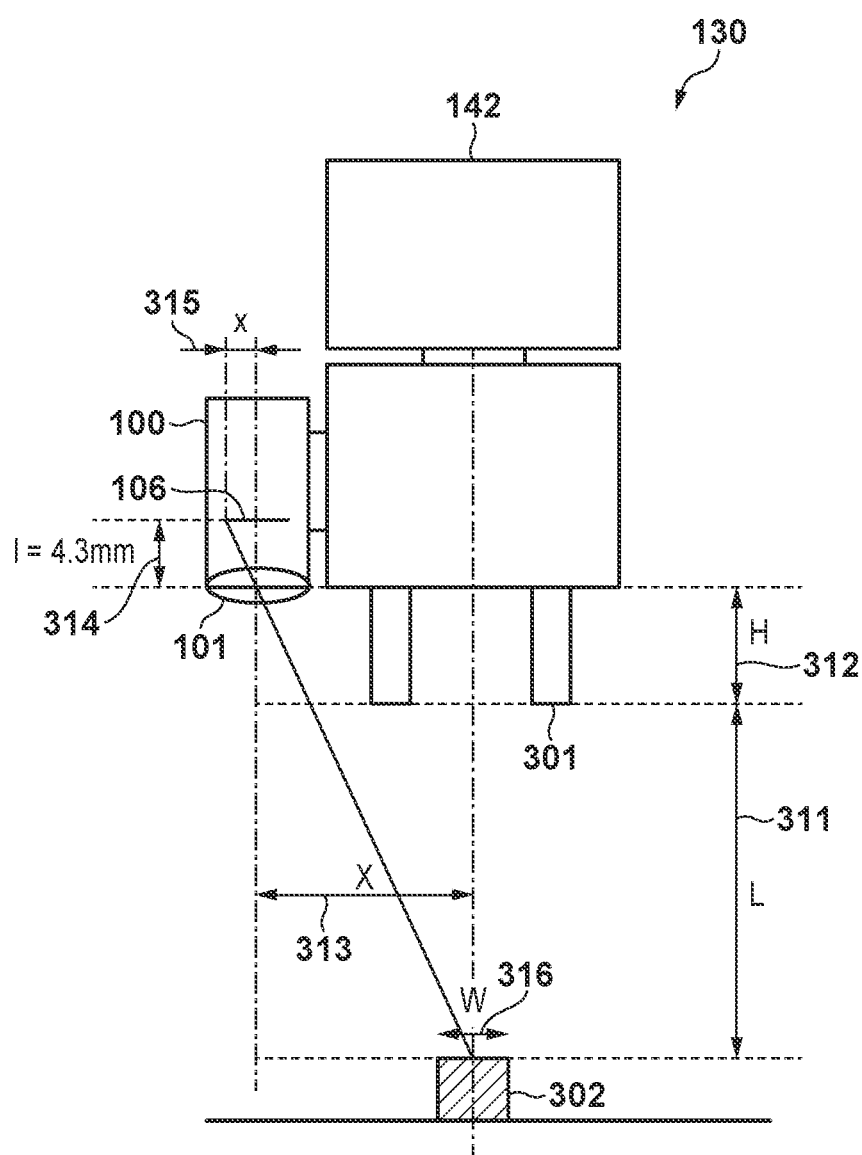
FIG. 5 is a diagram showing configurations of an arm and a camera according to the third embodiment.

The following will describe calibration information that is generated as a result of the above-described processing shown in FIG. 4 with reference to FIGS. 5, 6A, and 6B. First, FIG. 5 will be referenced. Note that, in FIG. 5, the same reference numerals are given to the same portions as those in FIGS. 1A and 1B.

A hand portion 301 is a movable portion that is located at the leading end of the robot arm 130 and performs a holding operation. A workpiece 302 is an object to be held by the robot arm 130, or an object to be subjected to AF or shooting of the image capturing apparatus 100.

An object distance (L) 311 shows a distance between the leading end of the hand portion 301 and the workpiece 302. A distance (H) 312 between the front lens of the image capturing apparatus 100 and the leading end of the arm indicates the distance between a plane that is perpendicular to the optical axis of the first fixed lens group 101 of the image capturing apparatus 100, and a plane formed by the leading end of the hand portion 301.

A distance (X) 313 between the lens optical axis and the hand central axis indicates a distance between the optical axis of the image capturing apparatus 100 and the central axis of an arm portion 142 (the approximate central axis when it holds the workpiece). A focal length (l) 314 indicates a focal length of the image capturing apparatus 100. An offset amount (x) 315 from the image center indicates a difference (offset amount) between the central position of the workpiece 302 of a captured image obtained by the image capturing apparatus 100 capturing an image of the workpiece 302, and the central position of the image sensor 106. A workpiece size (W) 316 indicates an actual size of the workpiece 302 (actual size information).

In the present embodiment, the distance (H) 312 between the front lens and the leading end of the arm is set to 50 mm, the distance (X) 313 between the lens optical axis and the hand central axis is set to 40 mm, and the focal length (l) 314 is set to 4.3 mm, but the present invention is not limited to these.

FIGS. 6A and 6B will be referenced below. First, in FIGS. 6A and 6B, the object distance (L) and the object size (W) are pieces of information stored in the calibration processing shown in FIG. 4. Furthermore, the focal length (l) is information stored in the image capturing apparatus 100. Furthermore, rectangular sizes (W) of the object include a rectangular size (in-image size W) of the object shown in FIG. 6A, and a rectangular size (actual size W) of the object shown in FIG. 6B.

An example of a sequence when storing the rectangular size (in-image size W) of the object will be described.

In step S202 in FIG. 4, after the one-shot AF processing has been executed, the CPU 121 of the image processing controller 120 transmits an image capture request to the image capturing apparatus 100 via the communication device 124. When the camera microcomputer 114 of the image capturing apparatus 100 receives the image capture request from the image processing controller 120 via the communication device 116, the captured image is transmitted to the image processing controller 120 via the communication device 116.

Then, the CPU 121 performs matching between the received captured image and a sample image of the workpiece 302 stored in the secondary storage device 123, and stores, in the secondary storage device 123, size information (in the present embodiment, number of pixels) relating to the size of the captured image when it has the highest similarity. The sample image may also be stored in advance by a user in the secondary storage device 123, or a sample image for use in matching based on CAD information or the like may also be generated in advance.

On the other hand, when the rectangular size (actual size W) of the object is stored as calibration information, a method is conceivable in which a user stores, in advance, a position or the like at which the workpiece 302 is the largest based on CAD information or the like, as size information, in the secondary storage device 123.

Figure 7A:
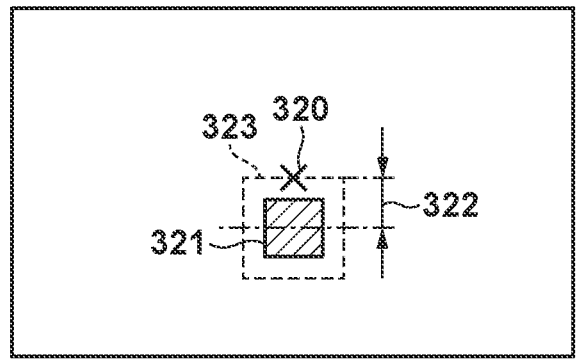
FIGS. 7A to 7C are diagrams showing examples of captured images according to the third embodiment.
Figure 7B:
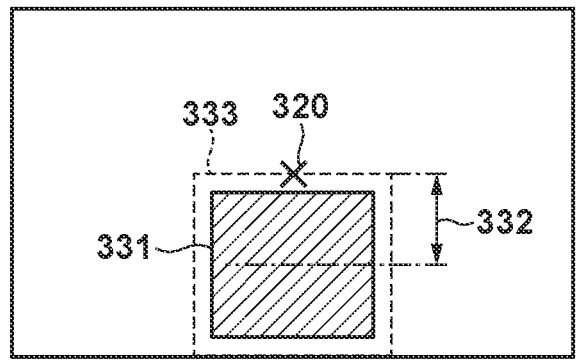
Figure 7C:
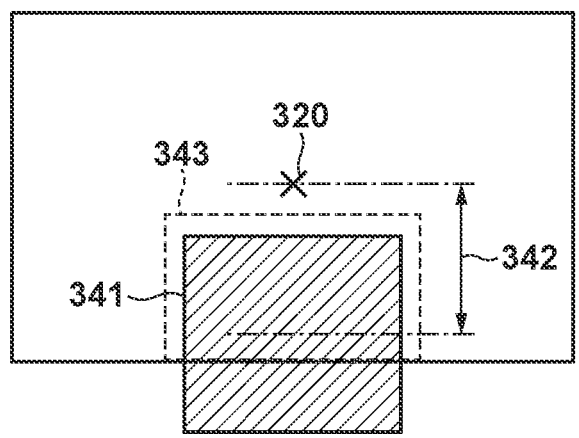

The following will describe a captured image that is obtained by the image capturing apparatus 100 capturing an image of the workpiece 302 with reference to FIGS. 7A to 7C.

FIG. 7A shows an example of a captured image in which the object distance (L) 311 is 350 mm (400 mm when the distance (H) 312 between the front lens and the leading end of the arm is added) and the workpiece size (W) 316 is 10 mm. FIG. 7B shows an example of a captured image in which the object distance (L) 311 is 250 mm (300 mm when the distance (H) 312 between the front lens and the leading end of the arm is added) and the workpiece size (W) 316 is 10 mm. FIG. 7C shows an example of a captured image in which the object distance (L) 311 is 150 mm (200 mm when the distance (H) 312 between the front lens and the leading end of the arm is added) and the workpiece size (W) 316 is 10 mm.

In FIGS. 7A to 7C, the reference numeral 320 denotes a central position of the picture plane. The reference numerals 321, 331, and 341 denote object images obtained by capturing the workpiece 302. The reference numerals 322, 332, and 342 are distances on the picture planes (offset amounts) between the central positions of the object images 321, 331, and 341, and the central position 320 of the picture plane, and correspond to the offset amount (x) 315 from the image center in FIG. 5.

Note that the object image 341 obtained by capturing an image of the workpiece 302 in FIG. 7C protrudes from the frame of the captured image, and the protruding portion is not captured. Furthermore, the reference numerals 323, 333, and 343 denoted by dotted lines in the drawings denote AF frames set as a result of execution of later-described AF frame setting processing.

AF Frame Setting Processing

Figure 8A:
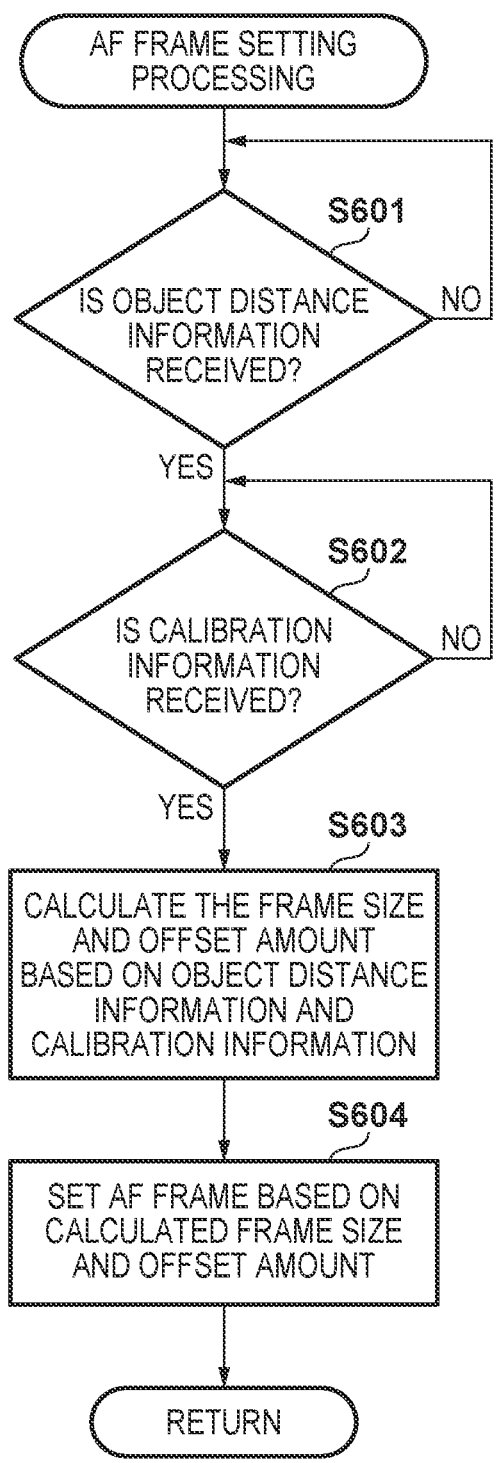
FIGS. 8A and 8B are flowcharts relating to AF frame setting processing according to the third embodiment.

The following will describe AF frame setting processing (focus detection area setting processing), which is a characteristic operation of the present embodiment, with reference to FIG. 8A. First, in step S601, the camera microcomputer 114 determines whether or not object distance information has been received from the image processing controller 120 via the communication device 116. If object distance information has been received, the procedure moves to step S602, and if no object distance information has been received, processing in step S601 is repeated until object distance information is received.

Then, in step S602, the camera microcomputer 114 determines whether or not calibration information has been received from the image processing controller 120 via the communication device 116. If calibration information has been received, the procedure moves to step S603, and if no calibration information has been received, processing in step S602 is repeated until calibration information is received.

Then, in step S603, the camera microcomputer 114 calculates the AF frame size and the offset amount from the image center of the AF frame, based on the object distance information and the calibration information that were received in respective steps S602 and S603. The method for calculating the AF frame size and the offset amount from the center of the AF frame will be described later.

Then, in step S604, the camera microcomputer 114 sets an area in which AF signal processing of the AF signal processing unit 113 is to be performed, based on the AF frame size and the offset amount from the center of the AF frame image that were calculated in step S603. Then, one-shot AF processing is executed based on the AF evaluation value received from the AF signal processing unit 113.

Hereinafter, the method for calculating the AF frame size and the offset amount from the center of the AF frame will be described with reference to FIGS. 6A, 6B, 9A, and 9B. An example of the calculating method will be described that is performed when the object distance information received in step S601 (referred to as "L2") is 550 mm, and the calibration information received in step S602 has the content shown in FIG. 6A.

Based on the received object distance information (L2) and calibration information, the offset amount x (pix) and the size w (pix) of one side of the AF frame on the image will be described in the following formulae 1 and 2.

$$x(\text{pix}) = (4.3 \ast X)/((L2+H) \ast 0.00155) \quad \text{(Formula 1)}$$

$$w(\text{pix}) = w' \ast (L+H)/(L2+H) \quad \text{(Formula 2)}$$

Since, in the above-described (Formula 1) and (Formula 2), X is 40 mm and w' is 69 pix, the offset x (pix) on the image≈185 (pix) and the size w (pix) of one side of the AF frame≈46 (pix) are satisfied.

Furthermore, if the calibration information received in S602 has the content shown in FIG. 6B, the following (Formula 3) is used instead of (Formula 2).

$$w(\text{pix}) = (4.3 \ast W)/((L+H) \ast 0.00155) \quad \text{(Formula 3)}$$

Since W is 10 mm, the size of one side of the AF frame is w (pix)≈46 (pix), which is the same as the result of (Formula 2).

Figure 9A:
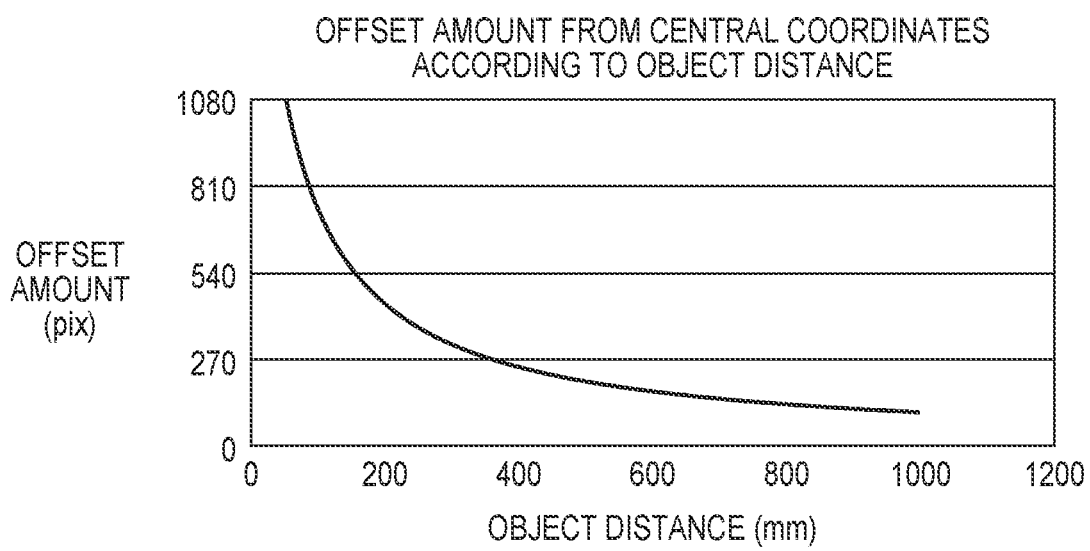
FIGS. 9A and 9B are diagrams showing AF frame offsets and sizes according to the third embodiment.

With respect to (Formula 1), FIG. 9A shows a graph indicating the relationship of the offset amount (pix) from the central coordinates according to the object distance. It is clear from FIG. 9A that the offset amount increases the shorter the object distance is. In the present embodiment, assume that the image size is 1920 pix×1080 pix, more than half of the workpiece 302 protrudes from the frame of the image if offset in the short direction of the image exceeds 540 (pix).

Figure 9B:
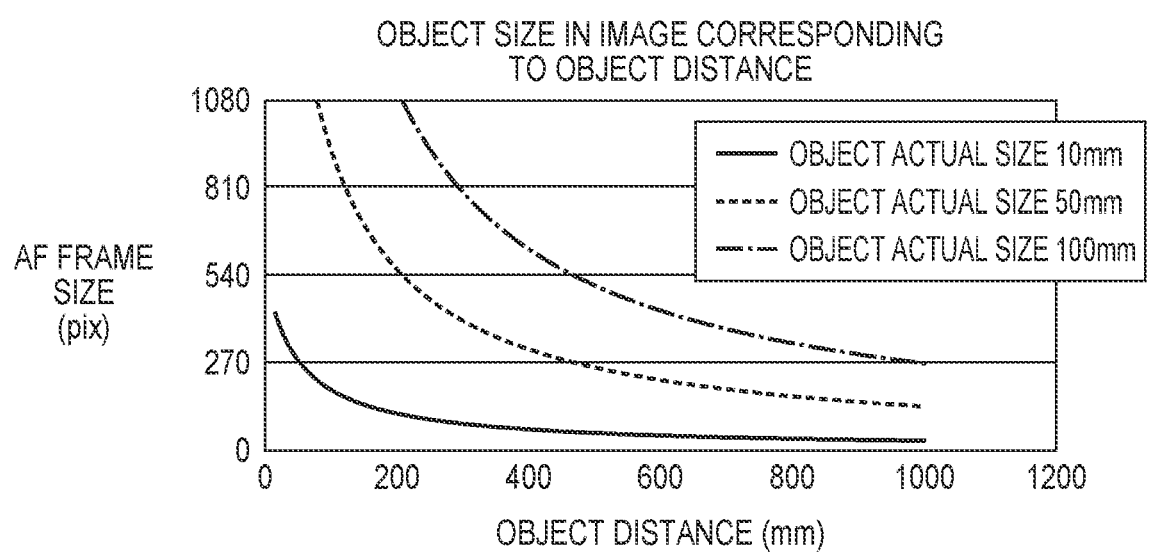

Furthermore, with respect to (Formula 3), FIG. 9B shows a graph indicating the relationship of the object size (pix) in the image that corresponds to the object distance. It is clear from FIG. 9B that the object size (pix) increases the shorter the object distance is. It is clear from FIGS. 9A and 9B that the objects will start protruding from the frame of the image if half of the sum of the offset amount (pix) and the object size (pix) exceeds 540 (pix). If an object protrudes from the frame of the image, an AF frame is set so as to include the end of the protruding object image, as shown in FIG. 7C.

The size of the AF frame may be set to a size such that the workpiece 302 with the size obtained using the above-described method in the captured image matches the AF frame size or to a size that is larger by a predetermined ratio or a predetermined amount, in view of a driving error of the arm portion 142, the above-described matching accuracy, and the like.

AF Control Processing

Figure 8B:
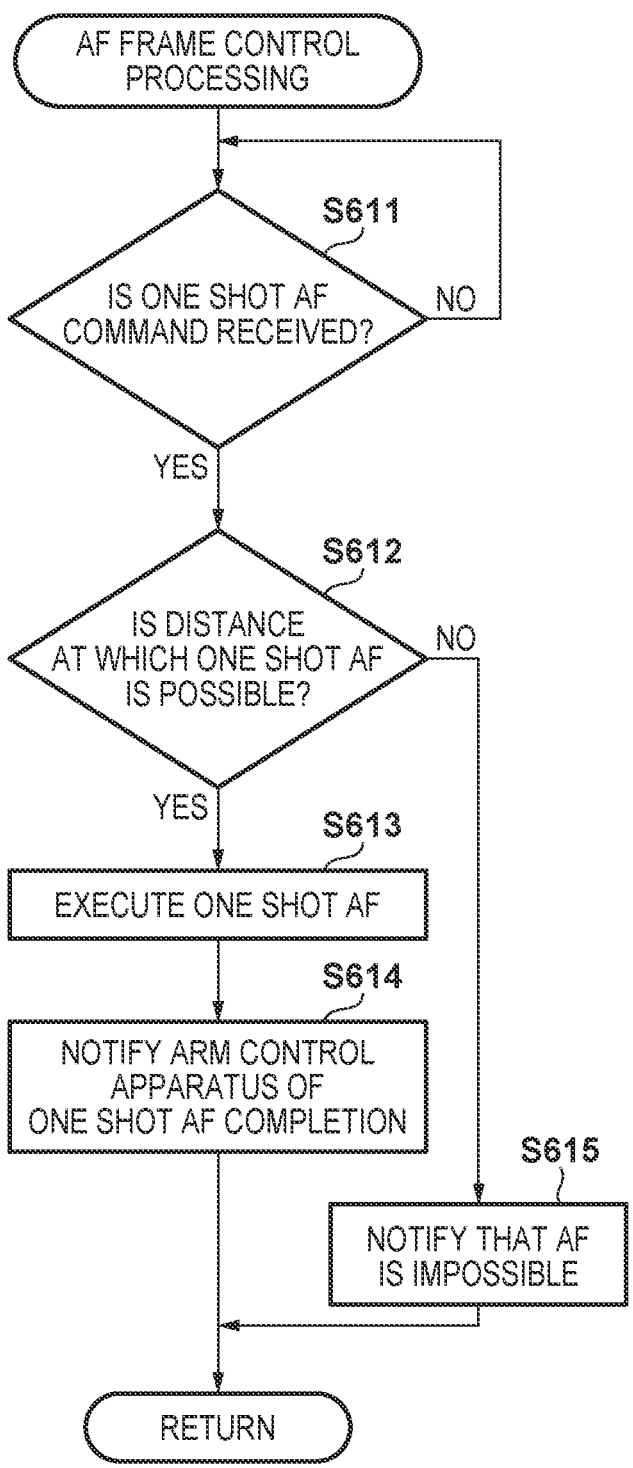

The following will describe AF control processing with reference to FIG. 8B. First, in step S611, the camera microcomputer 114 determines whether or not a one-shot AF command has been received from the image processing controller 120. If a one-shot AF command has been received, the procedure moves to step S612, and if no one-shot AF command has been received, processing in step S611 is repeated until a one-shot AF command is received.

Then, in step S612, it is determined whether or not the object to be subjected to one-shot AF is located at a distance at which one-shot AF is possible. An example of determining whether or not an object is located at a distance at which one-shot AF is possible will be described below.

When the object distance information received by the camera microcomputer 114 in step S601 is converted into the focus lens position, it is determined whether or not the focus lens position is within a lens drivable range that is stored in the storage unit 115. A method is conceivable in which it is determined that one-shot AF is possible if the focus lens position is within the lens drivable range, and it is determined that one-shot AF is not possible if the focus lens position is not within the lens drivable range.

As another method, it is determined based on FIGS. 9A and 9B described above whether or not half of the sum of the offset amount (pix) and the object size (pix) exceeds 540 (pix). If 540 (pix) is exceeded, the object protrudes from the frame of the image, and thus this is determined as being an area in which one-shot AF is not possible.

As yet another method, there is also a method in which it is determined based on FIG. 9A that it is a distance at which one-shot AF is not possible if the offset, in the short direction, of the image exceeds 540 (pix) and more than half of the workpiece 302 protrudes from the frame of the image.

Then, in step S613, one-shot AF is executed. In the one-shot AF, the camera microcomputer 114 extracts a high-frequency component from video signals in the AF frame that was set by the AF signal processing unit 113 in step S604, and drives the focus lens to move to the position at which the high-frequency component is the largest. Note, however, that another control method may also be performed in the one-shot AF method.

Then, in step S614, upon completion of the one-shot AF, the camera microcomputer 114 notifies, via the communication device 116, the image processing controller 120 of the completion of the one-shot AF, and ends the procedure. On the other hand, in step S615, the camera microcomputer 114 notifies, via the communication device 116, the image processing controller 120 of the fact that the one-shot AF is not possible, and ends the procedure.

With the above-described AF frame setting processing and AF control processing, one-shot AF can be executed in a state in which an AF frame is set at an appropriate position in view of parallax between the arm portion 142 and the image capturing apparatus 100. Accordingly, it is possible to mitigate a situation in which an object other than a desired object is brought into focus.

Note that the above-described AF frame setting processing is applied only when, as shown in FIG. 5, the image capturing apparatus 100 is mounted on the arm portion 142 and operates together therewith. In other words, if the image capturing apparatus 100 is fixed to and placed at a position that is irrelevant to the operation of the arm portion 142, the camera microcomputer 114 instructs the AF signal processing unit 113 to set an AF frame at a fixed position irrespective of the distance between the arm portion 142 and the workpiece 302.

Modifications

Note that, in the configuration of the present embodiment, the image capturing apparatus 100 is fixed to the robot arm 130, and is moved in tandem with the robot arm 130. However, a case is also conceivable in which the image capturing apparatus 100 is not fixed to the robot arm 130 but is placed at a definite point. In this case, the focus, the brightness, and the shooting field angle with respect to an object are not variable and almost constant, irrespective of the position of the robot arm 130. Accordingly, it is not necessary to change the focus lens control, the focal length control, the aperture control, the shutter speed control, and the gain control based on information relating to the distance to the object. Due to such reasons, information as to whether the image capturing apparatus 100 is fixed to the robot arm 130 or is fixed at a definite point and performs shooting is transmitted from the image processing controller 120 to the image capturing apparatus 100. Also, the image capturing apparatus 100 changes (restricts) the camera control based on this information.

Furthermore, the image processing controller 120 is separate from the robot arm 130, but a configuration is also possible in which the image processing controller 120 is built into the robot arm 130.

Moreover, the present embodiment has a configuration in which object distance information indicating the distance to an object based on the position status of the robot arm 130 is transmitted from the image processing controller 120 to the image capturing apparatus 100. However, a configuration is also possible in which the position status of the robot arm 130 is transmitted to the image capturing apparatus 100. In this case, it is sufficient that the camera microcomputer 114 converts the position status of the robot arm 130 into information indicating the distance to the object.

Furthermore, the object distance information that indicates the distance to an object and is to be transmitted to the image capturing apparatus 100 is not necessarily the distance to the object in the current position status of the robot arm 130. By transmitting object distance information indicating the distance to the object in the next position status to which the robot arm is about to move, it is possible to execute various types of camera control when the robot arm is about to move, and to perform the operation of the robot arm 130 smoothly.

Advantages of Embodiments

As described above, in the foregoing embodiments, the image capturing apparatus 100 receives information indicating the distance to an object that is calculated based on the position status of the robot arm 130. The image capturing apparatus 100 executes the various types of camera control based on the information indicating the distance to the object.

Thus, as a result of the image capturing apparatus 100 receiving information indicating the distance to an object based on the position of the robot arm 130 or the position to which the robot arm 130 is about to move, it is possible to reduce the time required for camera control to fulfill shooting conditions such as the focus, the field angle, the brightness that are appropriate for acquiring an image of the object and recognizing the image. Accordingly, the robot arm 130 can smoothly operate.

The present invention has been described in detail with reference to suitable embodiments thereof, but the present invention is not limited to these specific embodiments, and various modifications are included in the present invention without departing from the spirit of the present invention. Portions of the foregoing embodiments may also be combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-048397, filed Mar. 15, 2018, which is hereby incorporated by reference herein in its entirety.

What is claimed is:

1. An image capturing apparatus that is attachable to a robot arm and performs a control relating to an image capturing operation based on positions of the robot arm and an object, the image capturing apparatus comprising:
   an image capturing device configured to capture an object image;
   a storage device configured to store first size information, which is related to a size of the object, and first distance information, which is related to a distance to the object; and
   at least one processor or circuit configured to function as the following units;
   a receiving unit configured to receive information relating to status of the robot arm from a control apparatus for controlling the robot arm; and
   an imaging control unit configured to control an operation for adjusting focus status of the image capturing device,
   wherein, if distance information relating to the distance to the object obtained based on the information relating to status of the robot arm received from the control apparatus by the receiving unit of the image capturing apparatus is second distance information, the imaging control unit sets an area for detecting the focus status based on the first size information, the first distance information, and the second distance information.

2. The image capturing apparatus according to claim 1, wherein the information relating to status of the robot arm is distance information relating to a distance between the robot arm and the object.

3. The image capturing apparatus according to claim 1, wherein the imaging control unit controls the focus lens to not move if a movement amount of the focus lens is equal to or smaller than a predetermined value, the movement amount of the focus lens being obtained based on the information relating to status of the robot arm received from the control apparatus by the receiving unit.

4. The image capturing apparatus according to claim 1, wherein the first size information is size information relating to the size of the object when the first distance information is received, the size of the object being based on an image captured by the image capturing device.

5. The image capturing apparatus according to claim 1, wherein the first size information is information that is related to an actual size of the object and is stored in advance in the control apparatus.

6. An image capturing apparatus that is attachable to a robot arm and performs a control relating to an image capturing operation based on positions of the robot arm and an object, the image capturing apparatus comprising:
   an image capturing device configured to capture an object image; and
   at least one processor or circuit configured to function as the following units;
   an acquiring unit configured to acquire information indicating whether or not the image capturing apparatus is attached to the robot arm;
   a receiving unit configured to receive information relating to status of the robot arm from a control apparatus for controlling the robot arm; and
   an imaging control unit configured to control an image capturing operation of the image capturing device that is performed on an object,
   wherein the imaging control unit controls to set control parameters of the image capturing operation based on the information relating to status of the robot arm that was notified by the control apparatus,
   wherein, if the image capturing apparatus is not attached to the robot arm, the imaging control unit restricts the control of the image capturing operation that is performed based on the information relating to status of the robot arm received from the control apparatus by the receiving unit.

7. A method for controlling an image capturing apparatus that is attachable to a robot arm and performs a control relating to an image capturing operation based on positions of the robot arm and an object, the method comprising:
   reading out first size information, which is related to a size of the object, and first distance information, which is related to a distance to the object from a storage device;
   receiving information relating to status of the robot arm from a control apparatus for controlling the robot arm; and
   controlling an operation for adjusting focus status of the image capturing apparatus,
   wherein, in the controlling, if distance information relating to the distance to the object obtained based on the information relating to status of the robot arm received from the control apparatus in the receiving is second distance information, an area for detecting the focus status is set based on the first size information, the first distance information, and the second distance information.

8. An image capturing system comprising:
   an image capturing apparatus that is attached to a robot arm and performs a control relating to an image capturing operation based on positions of the robot arm and an object;
   the robot arm; and
   a control apparatus configured to control the image capturing apparatus,
   wherein the control apparatus includes:
   at least one processor or circuit configured to function as a notification unit configured to notify the image capturing apparatus of information relating to status of the robot arm, and
   the image capturing apparatus includes:
      an image capturing device configured to capture an object image;
      a storage device configured to store first size information, which is related to a size of the object, and first distance information, which is related to a distance to the object; and
      at least one processor or circuit configured to function as the following units:

an imaging control unit configured to control an operation for adjusting focus status of the image capturing device; and
a receiving unit configured to receive the information relating to status of the robot arm,
wherein, if distance information relating to the distance to the object obtained based on the information relating to status of the robot arm received from the control apparatus by the receiving unit is second distance information, the imaging control unit sets an area for detecting the focus status based on the first size information, the first distance information, and the second distance information.

\* \* \* \* \*